United States Patent [19]
Shabbits et al.

[11] Patent Number: 5,794,820
[45] Date of Patent: Aug. 18, 1998

[54] DISPENSING MACHINE

[76] Inventors: Gordon Shabbits, Box 127, Pense, Saskatchewan, Canada, S0G 3W0; Orville Olm, 45 Kirk Cres, Sasakatoon, Sask, Canada, 57H 3B1

[21] Appl. No.: 544,101

[22] Filed: Oct. 17, 1995

[51] Int. Cl.⁶ .................................................. B65D 88/54
[52] U.S. Cl. .......................... 222/307; 222/365; 222/559
[58] Field of Search ....................... 222/305, 307, 222/154, 365, 559, 438, 309, 310, 450, 340, 341, 439, 449, 453

[56] References Cited

U.S. PATENT DOCUMENTS

| | | | |
|---|---|---|---|
| 576,241 | 2/1897 | Van Ame | 222/365 |
| 1,303,141 | 5/1919 | Younger | 222/307 |
| 2,122,216 | 6/1938 | Seawell | 222/365 |
| 2,408,009 | 9/1946 | Titus . | |
| 3,012,699 | 12/1961 | Denmann . | |
| 3,078,033 | 2/1963 | Ovrutsky . | |
| 3,082,935 | 3/1963 | Arak . | |
| 3,523,001 | 8/1970 | Sylvester et al. . | |
| 4,012,174 | 3/1977 | Seibel et al. . | |
| 4,979,878 | 12/1990 | Short et al. . | |

FOREIGN PATENT DOCUMENTS 1184061  3/1985  Canada .

Primary Examiner—Philippe Derakshani
Attorney, Agent, or Firm—Roylance, Abrams, Berdo & Goodman, L.L.P.

[57] ABSTRACT

The invention provides a dispensing machine which delivers or dispenses a uniform volume of a fluid, in particular, viscous fluids such as a topping for ice cream, frozen yoghurt, etc. The dispensing machine includes a reservoir and a control and dispensing module in which a tilting disk acts as both a piston and an inlet valve to a measuring chamber for delivering a fixed volume of a fluid through a valve.

33 Claims, 17 Drawing Sheets

DISPENSING MACHINE

FIELD OF THE INVENTION

The present invention relates to a dispensing machine and method for dispensing a uniform volume of a fluid while minimizing leakage and/or spillage of the fluid.

BACKGROUND OF THE INVENTION

In the food services and confection industries, it is often desirable to apply food toppings, for example, syrup or fruit-laden ice, to satisfy a very wide array of consumer demands and preferences. In "fast-food" outlets, several different types of food toppings may be available for applying to various foods. These food toppings are often stored in containers which are sealed at the top, usually by a screw-on lid or snap-closed lid. When it becomes necessary to dispense a particular food topping, the dispensing is done manually, typically comprising the following steps: a) unscrewing or unsnapping the container lid, b) locating and dipping a suitable long-handled spoon or ladle in the container, and c) transferring the loaded spoon or ladle between the container and the destination. Upon emptying of the spoon or ladle, the spoon or ladle is cleansed or returned to the container, and the lid may be replaced upon the container in order to maintain sanitary conditions and prevent spoilage of the food topping. Any spillage which may have occurred during this operation is usually then cleaned from and around the container.

Thus, a manual dispensing operation has numerous limitations which affect both the efficiency and cleanliness of a fast food outlet. As is apparent from the above procedure, these include excessive time spent by the server during the numerous manual actions, the repetitive cleaning of containers, utensils and surroundings, wasted stock from spillage and an inconsistent delivery of a fixed amount of topping to a customer's purchase resulting in an inconsistent product being delivered to the customer as well as poor inventory control for the business. Accordingly, each of these limitations contribute to a lower productivity for this aspect of the fast-food operation.

Accordingly, there has been a need for dispensing machine that can be used for dispensing viscous fluids, such as food industry toppings which overcome the problems and limitations outlined above. Specifically, there has been a need for a machine that quickly and effectively delivers a uniform volume of material in a neat and consistent manner and which further requires minimal cleaning of the machine and provides sanitary conditions to the dispensed fluids. Furthermore, there has been a need for a machine that is reliable, relatively simple in construction, so as to reduce the manufacturing and maintenance costs of the machine and also modular and expandable in order to allow the system to be assembled to suit the specific requirements of a business.

The prior art reveals that there are many different types of positive displacement pumps which can be used to dispense fluids. Examples of such devices are described in the following U.S. Pat. Nos.: 3,078,033, "Pumping Means", issued to I. Ovrutsky on Feb. 19, 1963; 3,082,935 "Aquarian Pump" issued to H. M. Arak on Mar. 26, 1963; 4,979,878 "A Relieved Piston Valve for Fluid Motor and Fluid Pump" issued to Short et al. on Dec. 25, 1990; 3,012,699 "A Dispensing Device for Relatively Thick Liquids" issued to S. A. Denamn on Dec. 12, 1961; 3,523,001 "An Aerosol Sampler Arrangement and Pump Therefor" issued to D. Sylvester et al on Aug. 4, 1979; 2,404,009 "A Fountain Pump" issued to T. L. Titus on Sep. 24, 1946; and, 4,012,174 "A fuel Priming Pump" issued to Seibel et al. on Mar. 15, 1977.

While the prior art teaches pumping devices with tilting pistons, the prior art does not teach a device which may be selectively pivoted within a measuring chamber so as to expel a fixed volume of fluid from the measuring chamber where the relative position of tilting corresponds to a selected volume to be dispensed.

SUMMARY OF THE INVENTION

In accordance with the invention, a dispensing apparatus for delivering a selected volume of a liquid is provided comprising:

a reservoir having an interior and exterior;

channel having a first end in fluid communication with the interior of the reservoir and a second end in fluid communication with the exterior of the reservoir;

valve sealing the second end of the channel;

a piston member having means for selectively pivoting the piston member within the channel at a location corresponding to the selected volume, the piston member pivoting between a first position where the piston member is in sealing contact with the channel and a second position where the piston member is out of sealing contact with the channel, the piston member also having means for displacing the piston member in a first direction from a resting position for expelling a volume of fluid from the channel through the valve and in an opposite direction for resetting the apparatus.

In a preferred form, the means for pivoting and means for displacing include first and second actuating rods pivotally connected to the piston member for moving the piston member between the first and second positions and in the first and opposite directions.

In another form, the means for pivoting includes a tilt cylinder and tilt piston operatively connected to one of said actuating rods for movement of the piston member between the first and second positions and movement of the tilt piston with respect to the tilt cylinder is responsive to gas pressure through a tilt valve.

In a still further and more specific form, the tilt valve is a single acting cylinder valve for controlling movement of the tilt piston with respect to the tilt cylinder in a single direction, the tilt valve responsive to a specific displaced position of the piston member with respect to the resting position and the piston member is biased towards the second position by a spring.

In another form, the means for displacing includes a displacement cylinder and displacement well operatively connected to the first and second actuating rods for displacement of the tilting disk in the first and opposite directions and movement of the displacement cylinder with respect to the displacement well is responsive to gas pressure through a displacement valve.

In a specific form, the displacement valve is a double acting cylinder valve to control movement of the displacement cylinder with respect to the cylinder well in the first and opposite directions, the displacement valve responsive to a volume selection system.

The invention also provides a volume selection system which includes a volume selection and sequence initiation means for initiating a dispensing sequence and a sequence termination means for terminating a dispensing sequence.

In a specific form of the volume selection system, the sequence initiation means includes:

at least one volume selection lever means, the volume selection lever means displaceable between a first position where said system is at rest and a second position;

latch means for holding said lever means in said second position;

displacement valve actuation means responsive to the lever means when the lever means is in the second position, the displacement valve actuation means for controlling the actuation of the displacement valve;

slide plate responsive to the lever means when the lever means is in the second position, the slide plate for controlling actuation of the tilt valve.

In a specific form, the volume selection lever means is a push button with a cone cam.

In another specific form of the volume selection system, the means for terminating includes latch release means on the latch plate for disengaging said lever means from the latch plate, the latch release means responsive to a specific displacement of the piston member with respect to the resting position and also includes a dispensed volume adjustment means for adjusting the expelled volume of fluid.

In a still further embodiment, the valve includes:

a valve disk and stem for occluding the second end of the channel, the valve stem received within the measuring channel and having a return bias spring acting to passively close the valve;

valve piston and cylinder on the valve stem for actively opening the valve disk in response to gas pressure through the tilt valve.

Preferably, the gas pressure is compressed $CO_2$ gas and the means for displacement includes a gas flow control means to control the displacement rate.

Still further, the reservoir may be provided with a heating or cooling unit to control the temperature of the reservoir and the reservoir is preferably modular with respect to the channel, valve and piston member.

In a specific form of the invention, a dispensing apparatus is provided comprising:

a reservoir having an interior and exterior;

channel having a first end in fluid communication with the interior of the reservoir and a second end in fluid communication with the exterior of the reservoir;

valve sealing the second end of the channel;

a piston member having first and second actuating rods for selectively pivoting the piston member within the channel at a location corresponding to the selected volume, the piston member pivoting between a first position where the piston member is in sealing contact with the channel and a second position where the piston member is out of sealing contact with the channel and for displacing the piston member in a first direction from a resting position for expelling a volume of fluid from the channel through the valve and in an opposite direction for resetting the apparatus.

a tilt cylinder and tilt piston operatively connected the first of said actuating rods for movement of the tilting disk between the first and second positions, the tilt cylinder and piston responsive to gas pressure through a single acting cylinder valve for controlling movement of the tilt piston with respect to the tilt cylinder in a single direction, the single acting cylinder valve responsive to a specific displaced position of the piston member with respect to the resting position;

spring on said first actuating rod for biasing the first actuating rod towards the second position;

displacement cylinder and displacement well operatively connected to the first and second actuating rods for displacement of the tilting disk in the first and opposite directions, wherein movement of the displacement cylinder with respect to the displacement well is responsive to gas pressure through a double acting displacement valve, the displacement valve responsive to a volume selection system.

the volume selection system including:

at least one volume selection lever, the volume selection lever displaceable between a rest position where said system is at rest and an active position;

latch for holding said lever in said active position;

displacement valve actuation member responsive to the lever when the lever means is in the active position, the displacement valve actuation member for controlling actuation of the displacement valve;

slide plate responsive to the lever when the lever is in the active position, the slide plate for controlling actuation of the tilt valve.

latch release member on the latch plate for disengaging said lever from the latch plate, the latch release member responsive to the displacement of the piston member with respect to the resting position.

BRIEF DESCRIPTION OF THE DRAWINGS

These and other features of the invention will be more apparent from the following description in which reference is made to the appended drawings wherein.

DETAILED DESCRIPTION OF THE INVENTION

Figure 1:
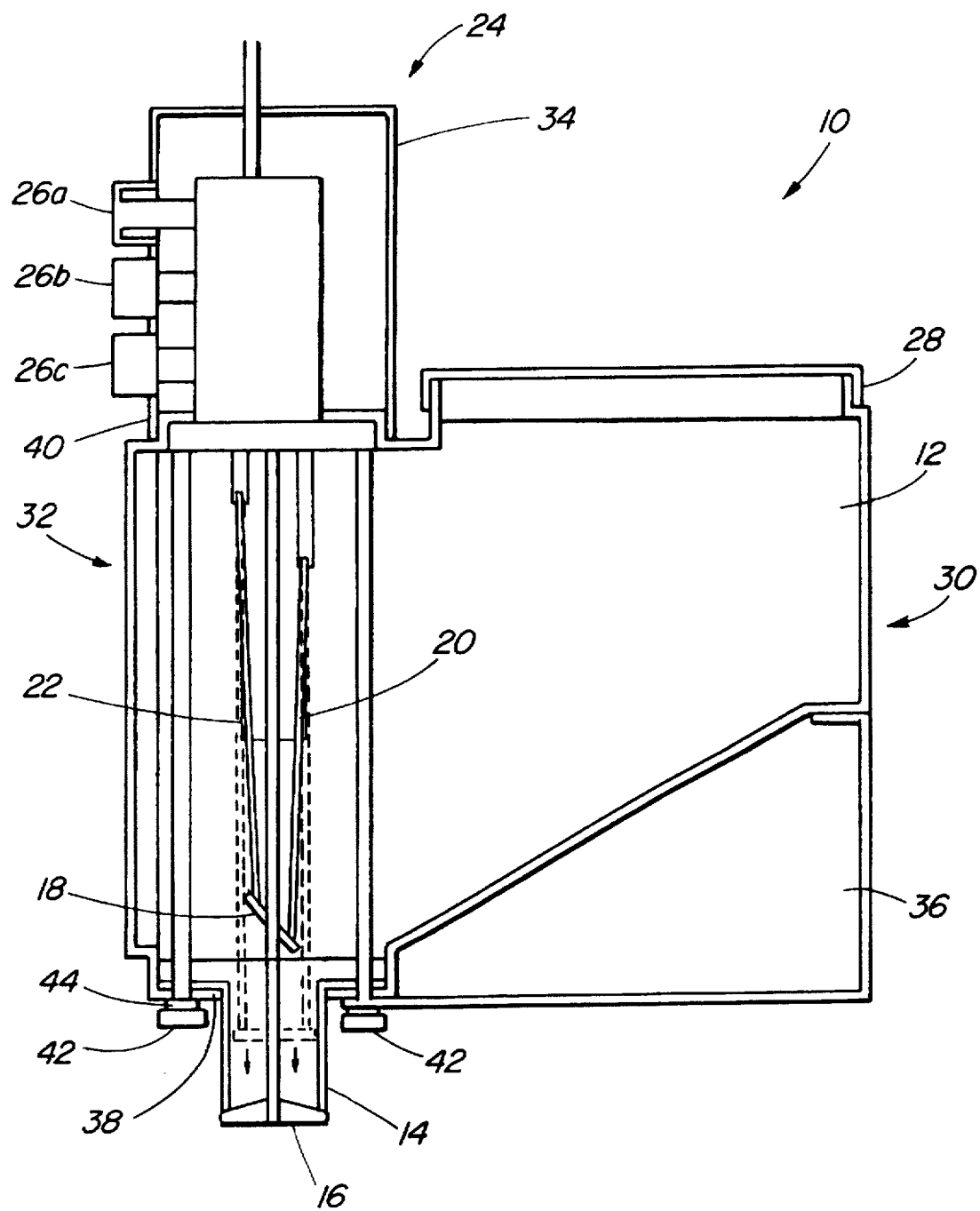
FIG. 1 is a cross-sectional view of the topping machine in accordance with the invention showing the piston in a tilted and horizontal configuration.
Figure 2:
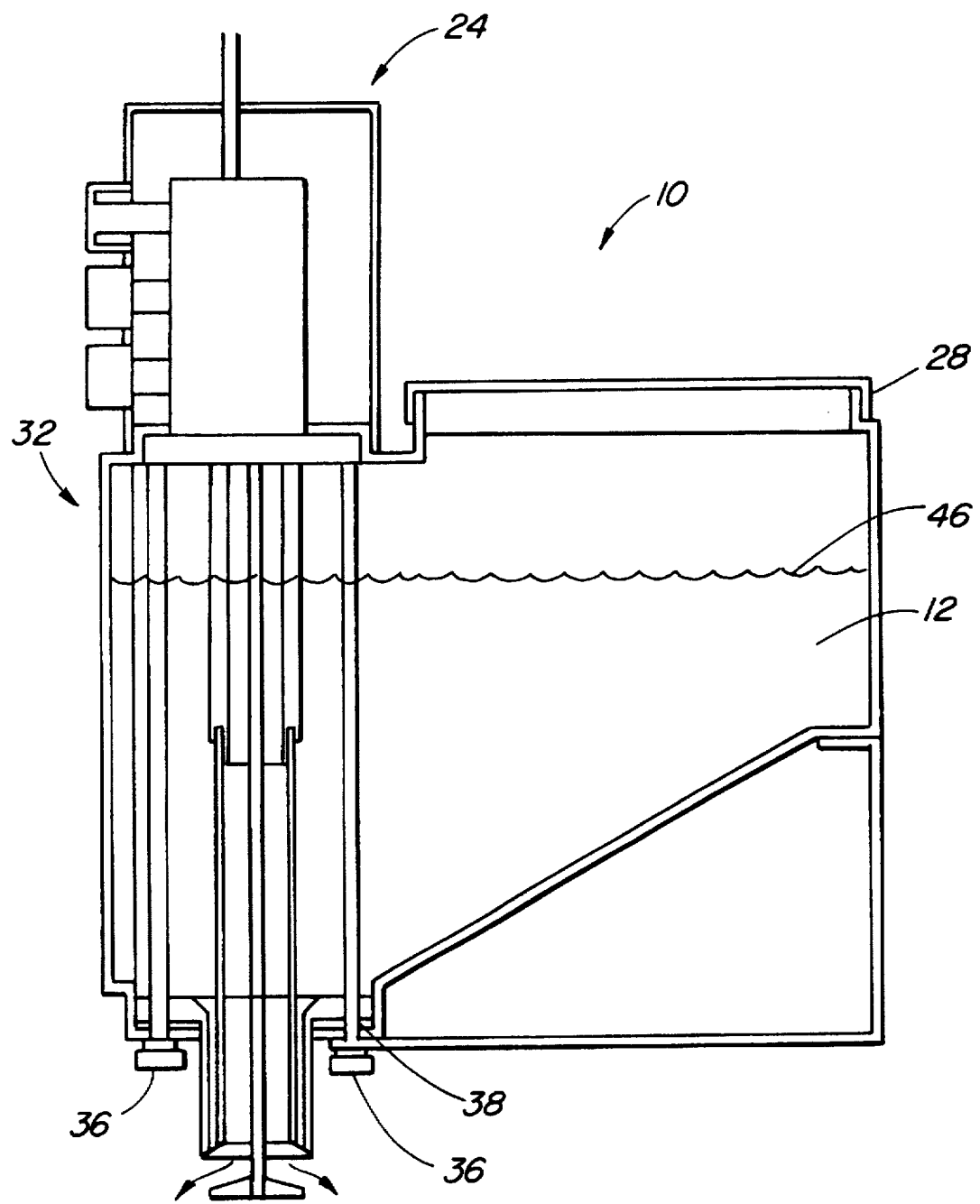
FIG. 2 is a cross-sectional view of the topping machine in accordance with the invention showing the piston at the end of the downward stroke and the valve open.

With reference FIGS. 1 and 2, a dispensing apparatus 10 is shown. The dispensing machine 10 is preferably fabricated in a number of modular components including a reservoir 12 and a dispensing and control module 32 with control portion 24. The modular assembly of the dispensing machine facilitates manufacturing and assembly of the machine as well as simplifying cleaning during use and the adaptation of the machine to a particular installation. As shown in FIGS. 1 and 2, the dispensing machine 10 is provided with a dispensing channel 14 with valve 16, tilting disk 18, actuating rods 20 and 22 and control module 24. The control portion 24 is provided with selection buttons 26a, 26b, 26c.

The control portion 24 is also provided with an outer case 34 to enclose the internal components of the control portion 24. The reservoir 12 is provided with a base 36 or support rack to facilitate holding multiple dispensers 10 in a row. In a preferred form, the base 36 is hollow and is used to hold a heating or cooling unit 37 to control the temperature of the contents of the reservoir 12.

Preferably, the reservoir 12 is a clear or translucent plastic to display the reservoir contents. In a typical fast food installation, the reservoir 12 will hold approximately four litres of a fluid. The reservoir 12 is also provided with a removable lid 28 to allow the reservoir 12 to be filled and to inhibit contamination of the reservoir 12 contents.

The dispensing and control module 32 is mounted on the front portion of the reservoir 12 through two mounting holes 38 and 40 at the front of the reservoir 12. The measuring chamber 14 protrudes through mounting hole 38 at the bottom of the reservoir 12. The control and dispensing module 32 is attached to the reservoir 12 by thumb-nuts 42 and sealed by a gasket 44. As shown in FIG. 2, a fluid is added to the reservoir 12 to a level as shown and designated 46. Preferably, the reservoir 12 is constructed so as to locate the measuring channel 14 on the underside and lowest position of the reservoir 12 in order to facilitate drainage of a fluid towards the measuring channel 14. This will also facilitate cleaning of the reservoir 12.

Figure 3:
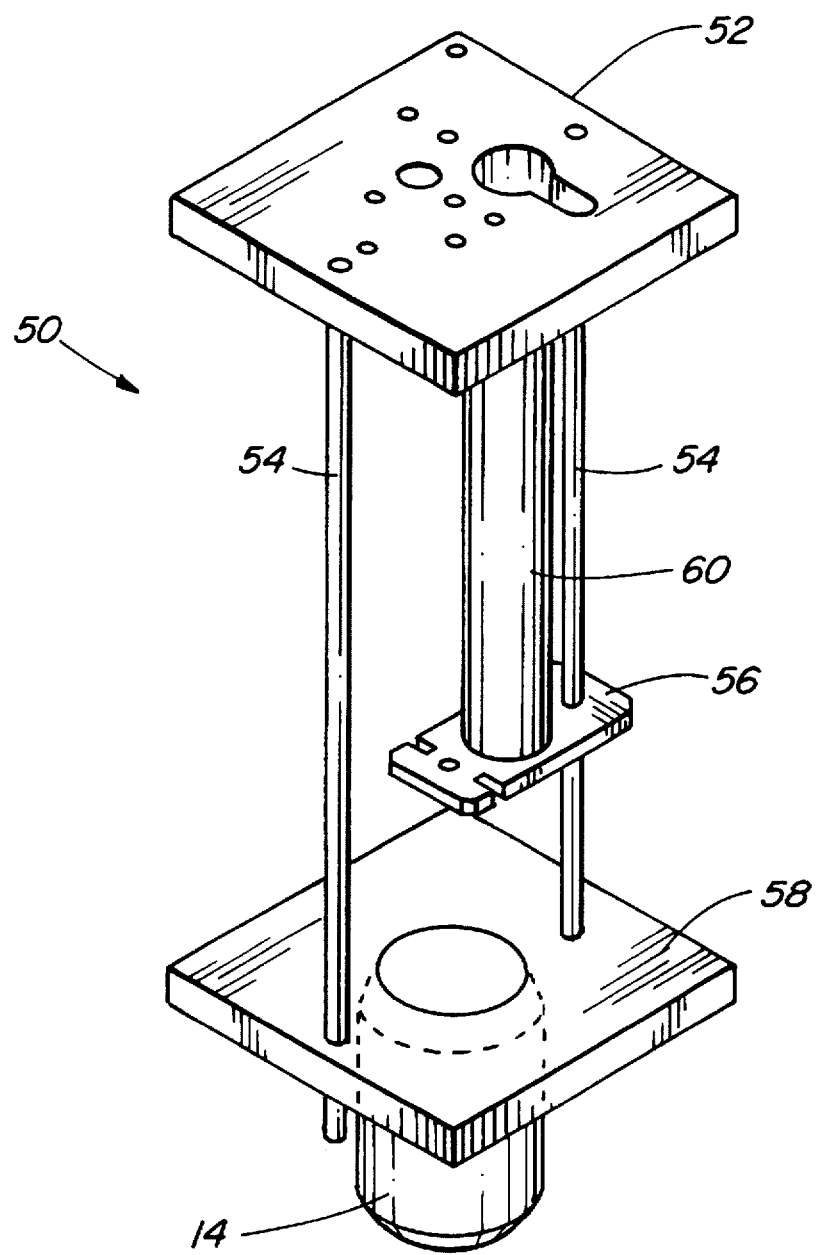
FIG. 3 is a perspective view of the dispenser module components in accordance with the invention.

As shown in FIG. 3, the control and dispensing module 32 includes a dispenser module frame 50 which includes a top plate 52, support rods 54, guide plate 56, and bottom plate 58 with dispensing chamber 14. The guide plate 56 is connected to the top plate 52 through cylinder well 60. Support rods 54 project beneath the bottom plate 58 to enable thumb-nuts 42 to tighten the control and dispensing module 32 against the reservoir 12. Accordingly, the control and dispensing module 32 assembly supports the control and dispensing system and allows for the easy removal of the module 32 from the reservoir 12 for cleaning and servicing.

Figure 4:
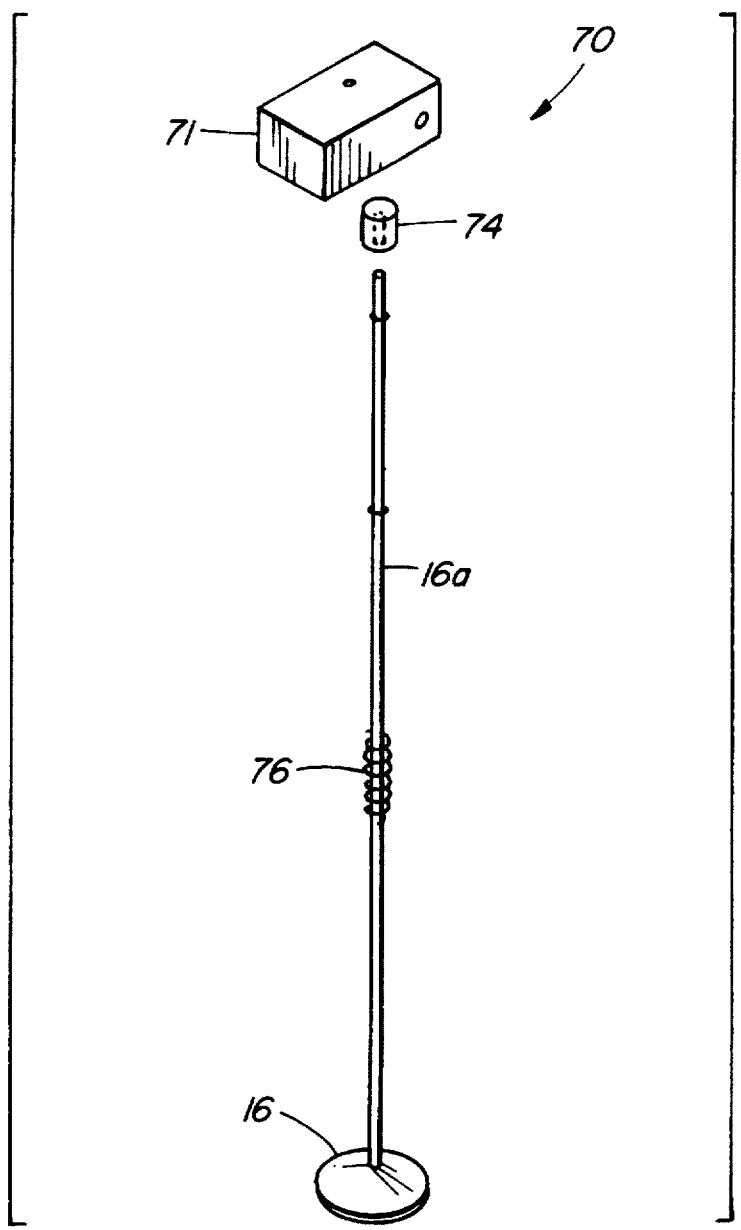
FIG. 4 is an exploded perspective view of the measuring chamber seal system in accordance with the invention.
Figure 5:
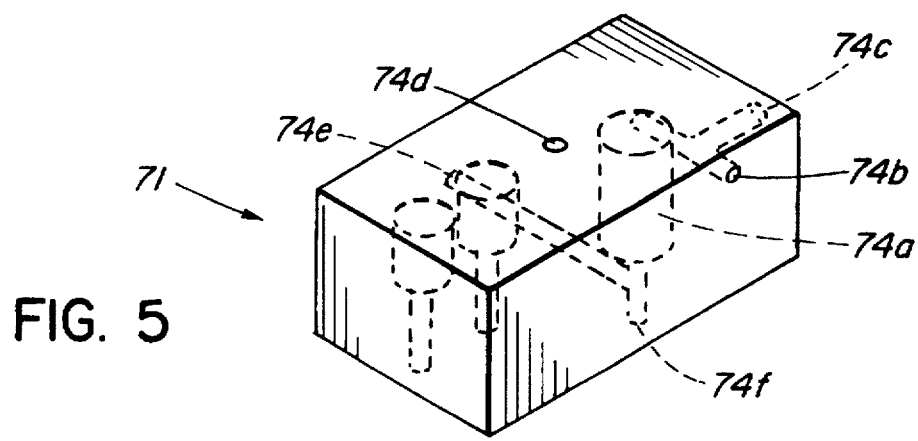
FIG. 5 is a perspective view of the top block in accordance with the invention.
Figure 6:
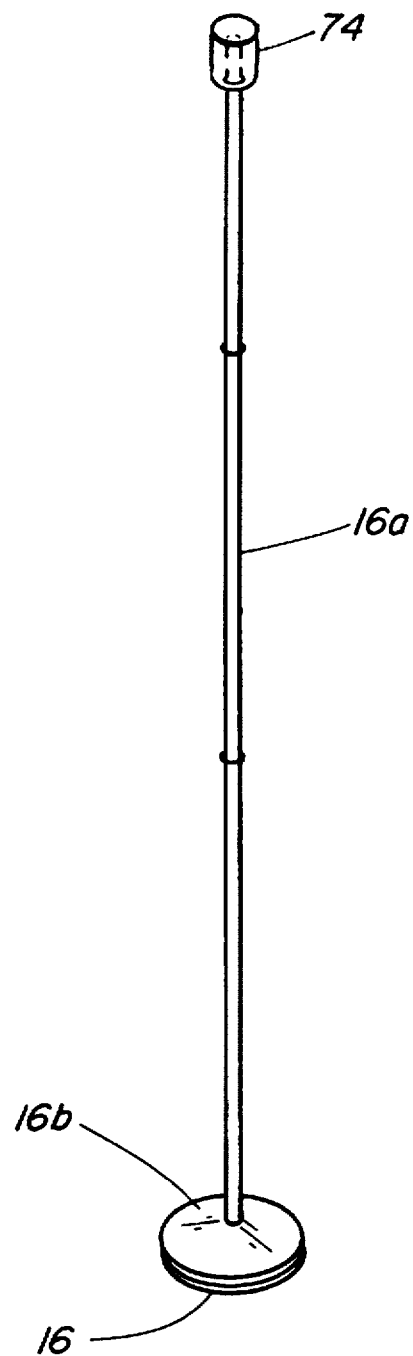
FIG. 6 is a perspective view of the measuring chamber seal assembly in accordance with the invention.

As shown in FIGS. 4, 5, and 6 the control and dispensing module 32 also includes a measuring chamber seal system 70 having a top block 71, valve 16, valve stem 16a, seal piston 74 and return spring 76. As shown in FIG. 5, the top block 71 includes a chamber seal actuating cylinder 74a with gas inlet 74b and gas outlet 74c. The piston 74 is received within cylinder 74a. The top block 72 also includes a main gas inlet 74d with outlets 74e and 74f to a three-way and four-way valve respectively (described below). This system 70 opens and closes the measuring (dispensing) chamber outlet 14, in order to control the flow of topping out of the dispenser 10. In the situation of dispensing a topping for ice-cream, the seal valve 16 shape and size are designed to spread the topping radially onto the base of the ice cream mound. The reciprocating action of the valve 16 is accomplished by the single-acting gas cylinder 74a built into the top block 71, which opens the seal valve 16 and a return spring 76 which closes the valve 16 and keeps it closed even if $CO_2$ pressure is lost, thereby preventing the dispenser from leaking. The valve 16 may include an elastomer gasket 16b to improve the seal. The top block 71 is attached to the frame of the device.

Figure 7:
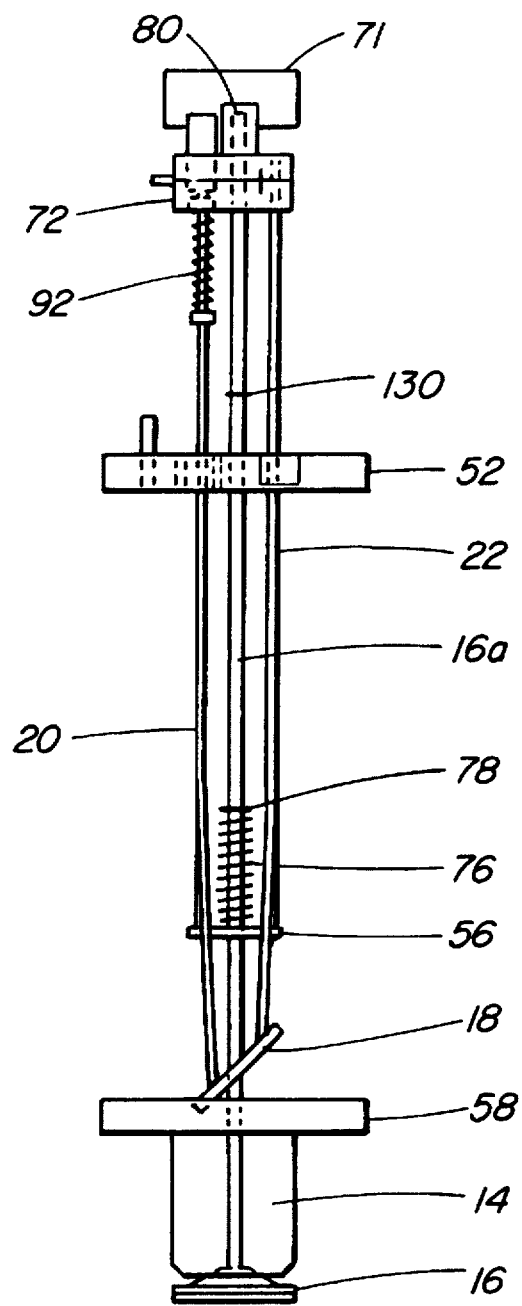
FIG. 7 is a side view of the measuring chamber seal system and ejector system in accordance with the invention.
Figure 8:
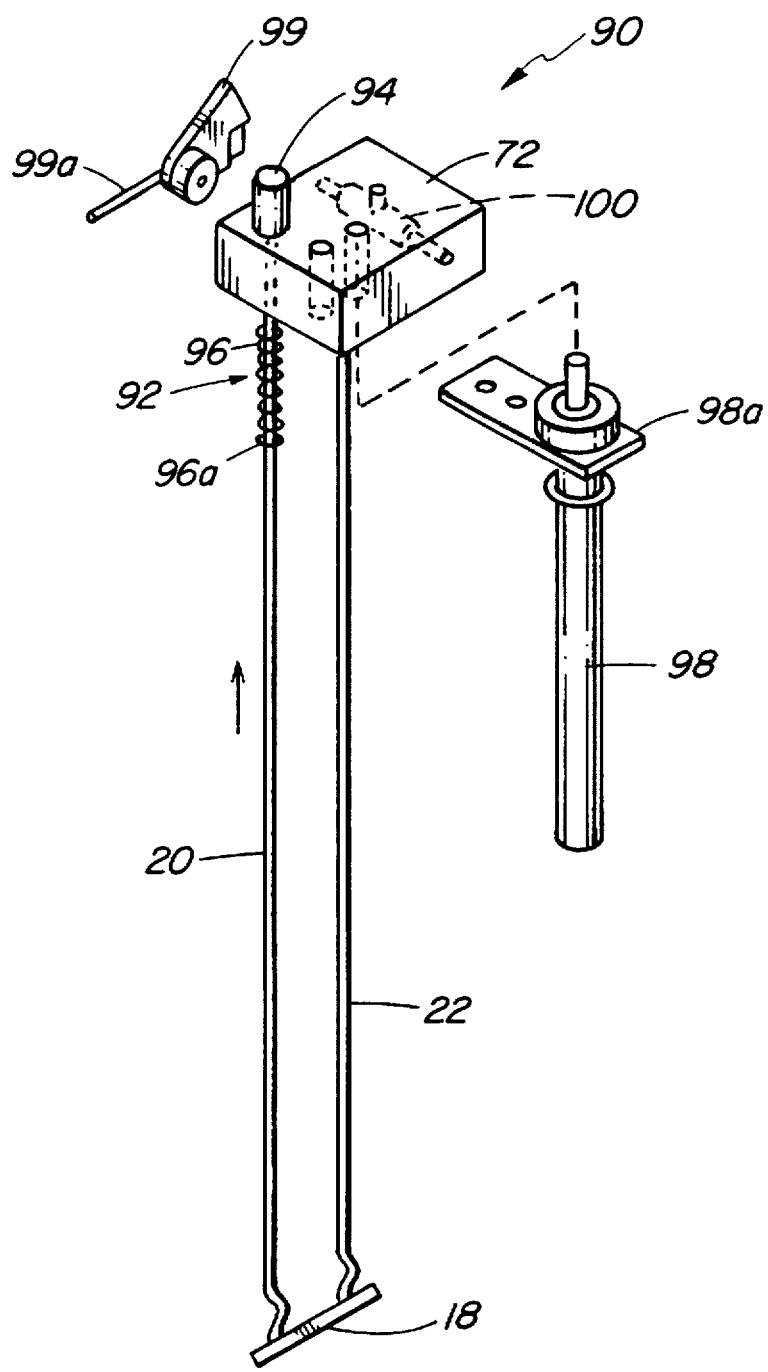
FIG. 8 is an exploded perspective view of the ejector system in accordance with the invention.

As shown in FIG. 7, the seal system 70 is assembled with valve 16 with valve stem 16a, shuttle block 72, and tilting disk 18 with actuating rods 20 and 22. The valve stem 16a is connected to valve 16 and passes through guide plate 56 and top plate 52 to shuttle block 72. The valve disk 16 is upwardly biased against the lower edge of the dispensing chamber 14 by compression spring 76 attached to the valve stem 16a through snap ring 78. Compression spring 76 acts between the guide plate 56 and snap ring 78. The upper end of the valve stem 16a is received within the shuttle block 72 and top block 71 within the seal cylinder 74a.

The dispensing and control module 32 is also provided with an ejector system 90 as shown in FIGS. 8, 9, 10, 11, 12, 13 and 14. The function of the ejector system 90 is to mix, measure a volume of a fluid and eject the fluid out of the measuring chamber 14. The tilting disk ejector 18 is connected to the shuttle block 72 via actuating rods 20 and 22 and tilt piston assembly 92. One rod 22 is fixed to the shuttle block 72, while the other control rod 20 reciprocates. The control rod 20 is pulled up by a single-acting piston 94a on rod 20 within gas cylinder 94 within shuttle block 72. At rest, the reciprocating rod 20 is pushed down by a second compression spring 96 and the ejector disk 18 is tilted approximately 50°. Compression spring 96 is retained on rod 20 by rod clamp 96a. The location at which the ejector disk 18 tilts to the horizontal position (FIG. 1) within the measuring chamber 14 determines the volume of topping ejected. The ejecting motion of the tilting disk 18 is controlled by a double-acting shuttle cylinder 98. The location of tilt is controlled by valve cam 99 with valve cam arm 99a.

Figure 9:
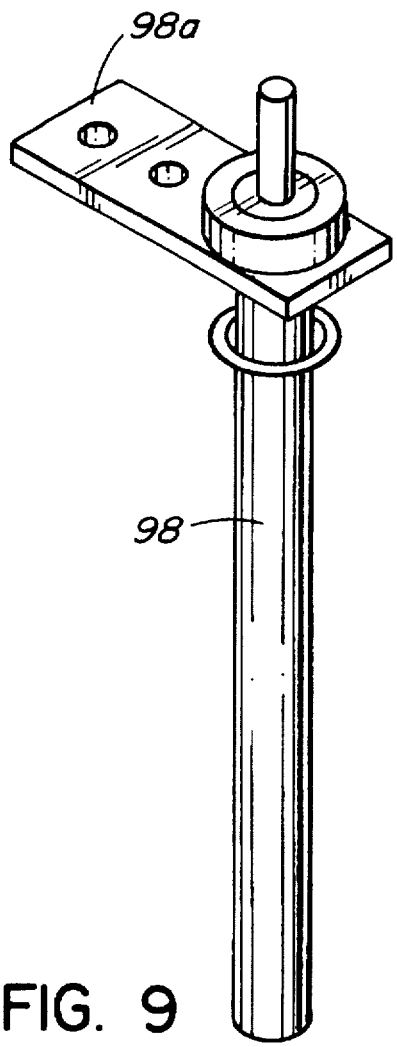
FIG. 9 is a perspective view of the shuttle cylinder and mount in accordance with the invention.

As seen in FIG. 9, the shuttle cylinder 98 is provided with a mounting bracket 98a for attachment of the shuttle cylinder 98 to the underside of the shuttle block 72. The shuttle cylinder 98 acts as a double acting piston is received within the cylinder well 60 for effecting two-way movement of the shuttle block 72 with respect to the frame 50.

Figure 11:
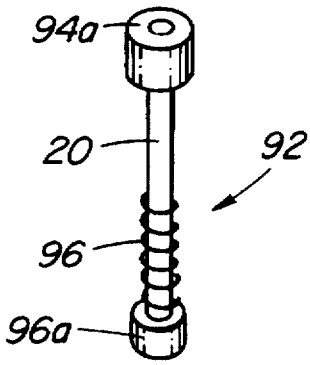
FIG. 11 is a perspective view of the tilt piston assembly in accordance with the invention.
Figure 10:
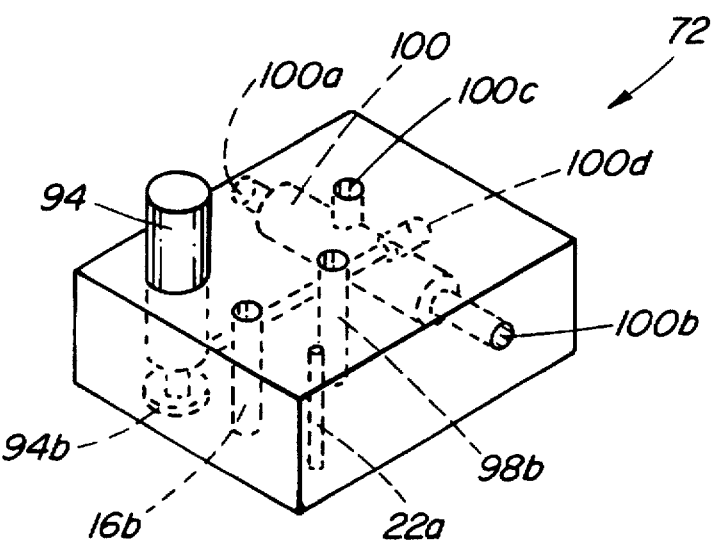
FIG. 10 is a perspective view of the shuttle block in accordance with the invention.
Figure 12:
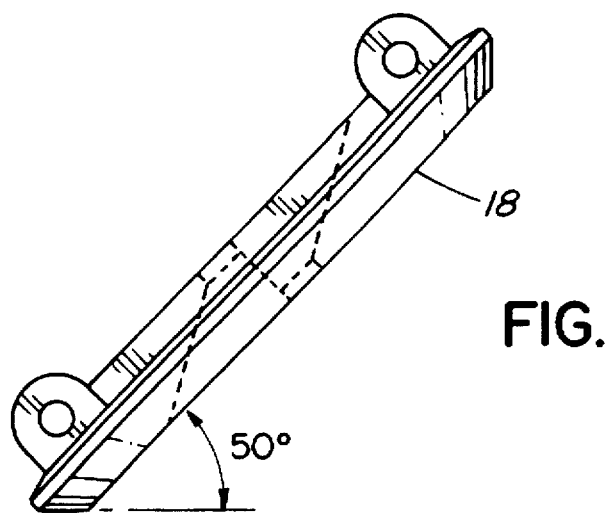
FIG. 12 is a side view of the tilting disk in accordance with the invention.
Figure 13:
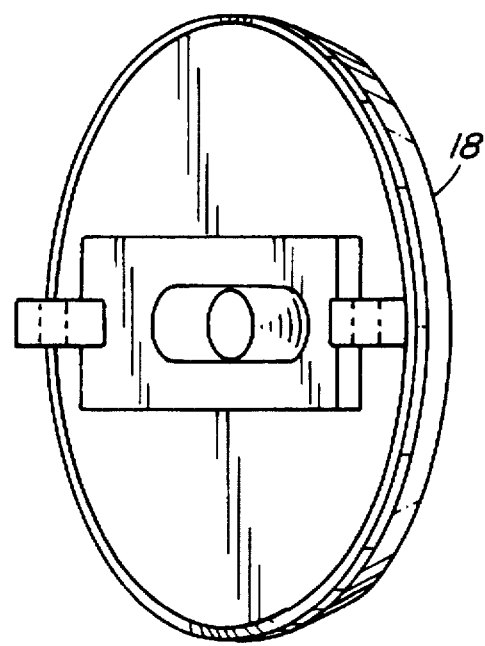
FIG. 13 is a top view of the tilting disk in accordance with the invention.
Figure 14:
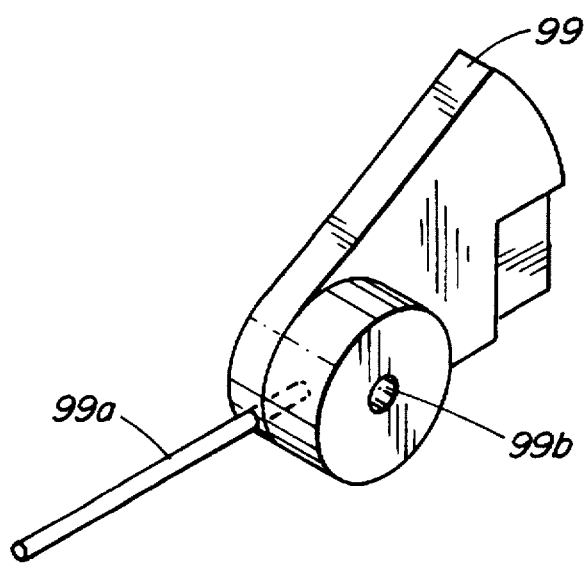
FIG. 14 is a perspective view of the three-way valve cam in accordance with the invention.
Figure 15:
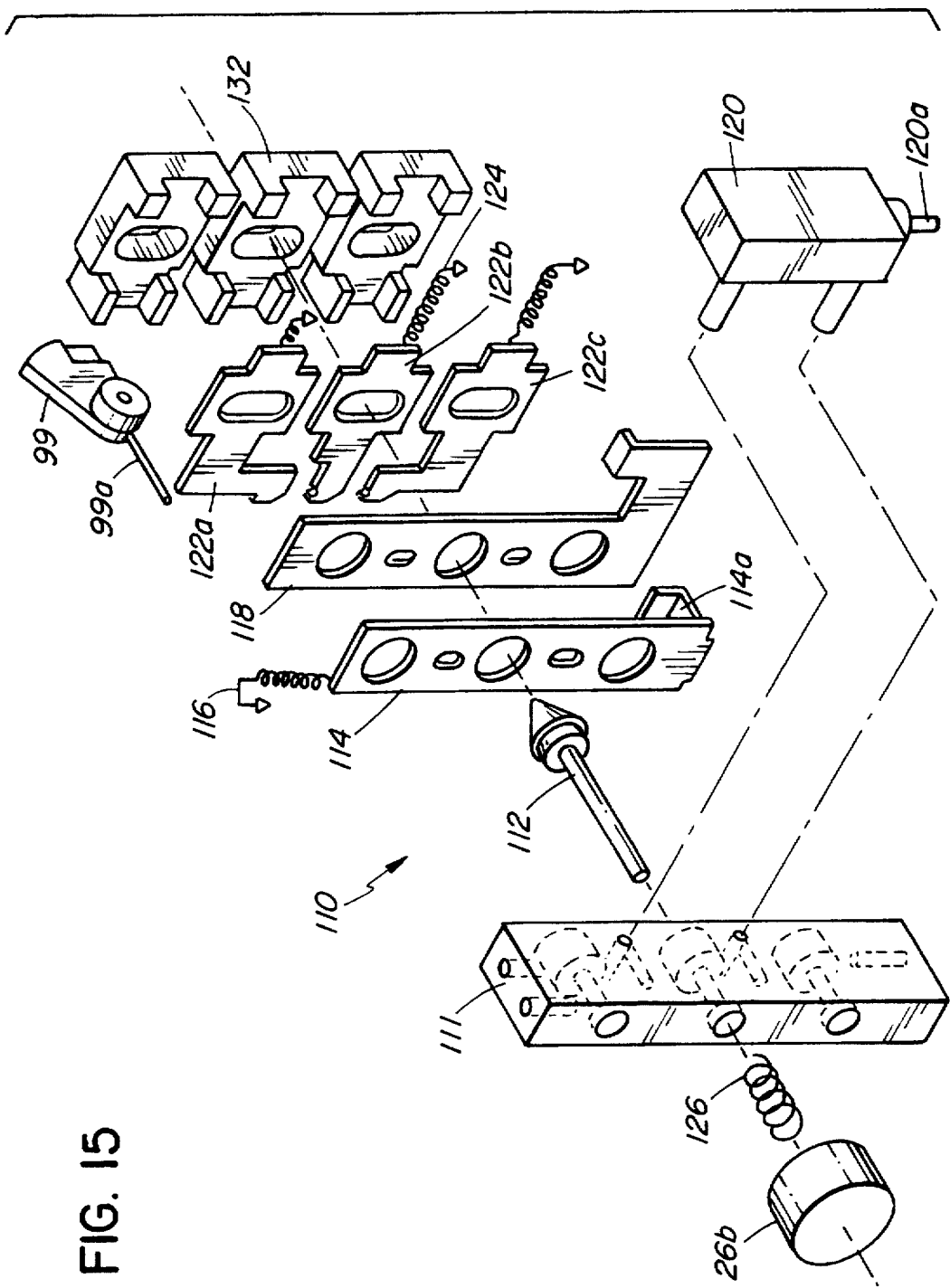
FIG. 15 is an exploded perspective view of the dispensed volume selector system in accordance with the invention.
Figure 16:
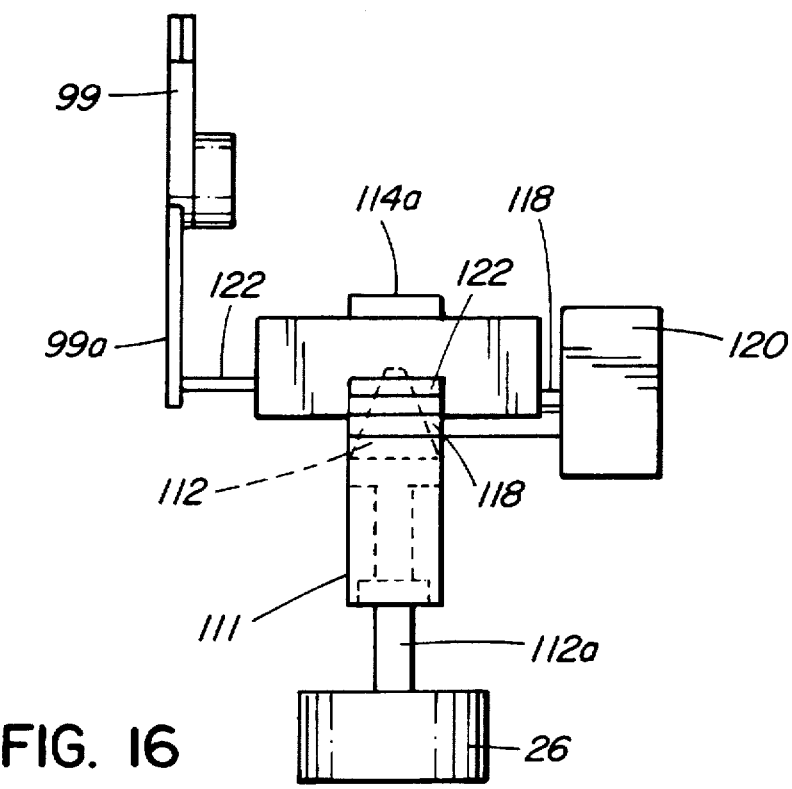
FIG. 16 is a top view of the dispensed volume selector system in accordance with the invention.
Figure 17:
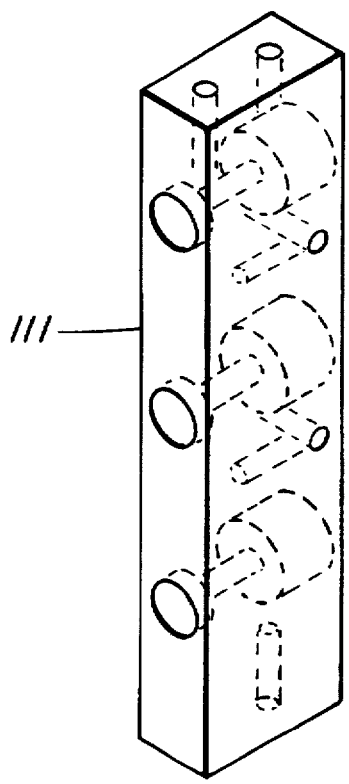
FIG. 17 is a perspective view of the push button block in accordance with the invention.
Figure 18:
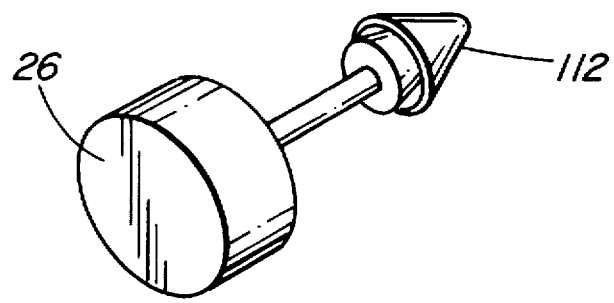
FIG. 18 is a perspective view of the push button assembly in accordance with the invention.
Figure 19:
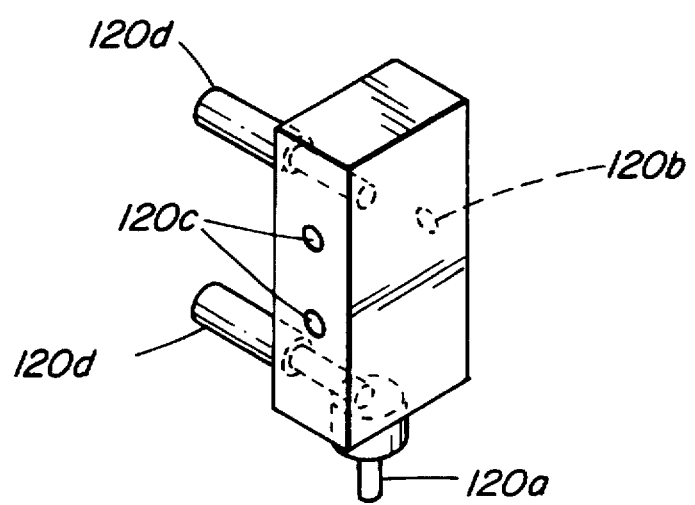
FIG. 19 is a perspective view of the 4-way shuttle control valve in accordance with the invention.
Figure 20:
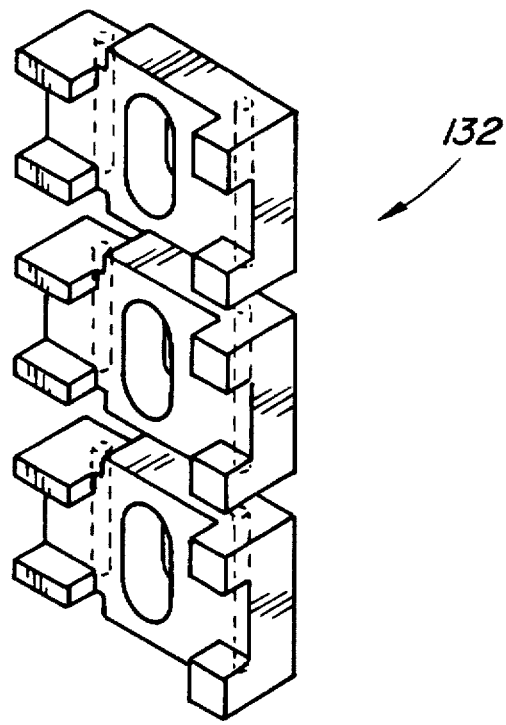
FIG. 20 is a perspective view of the adjustable horizontal slide blocks in accordance with the invention.
Figure 21:
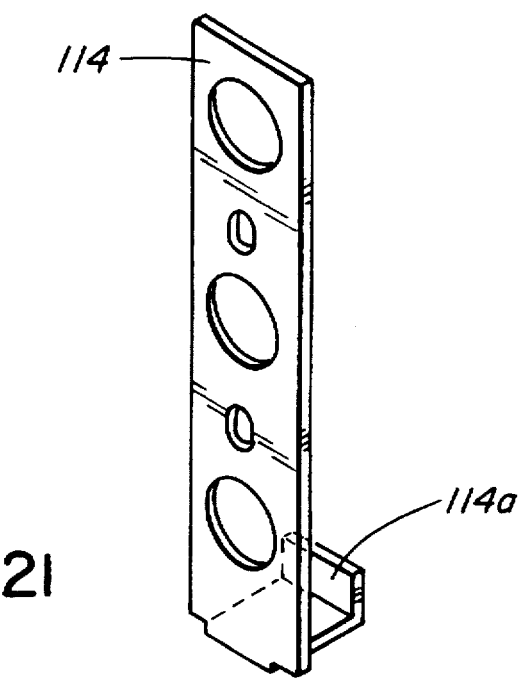
FIG. 21 is a perspective view of the latch plate in accordance with the invention.
Figure 22:
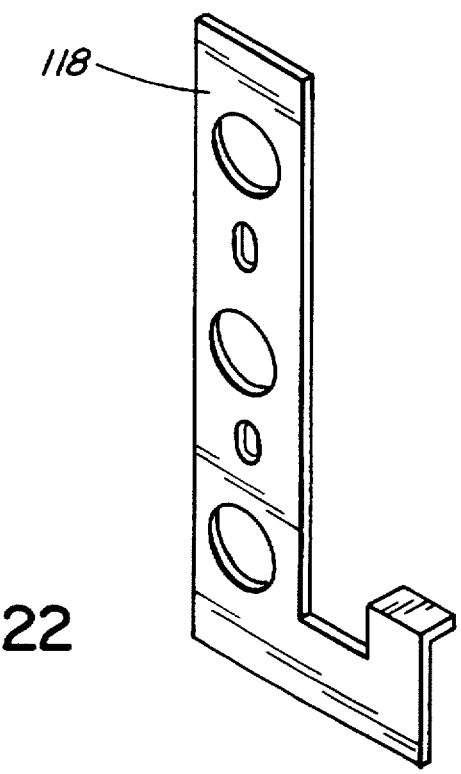
FIG. 22 is a perspective view of the valve plate in accordance with the invention.
Figure 23:
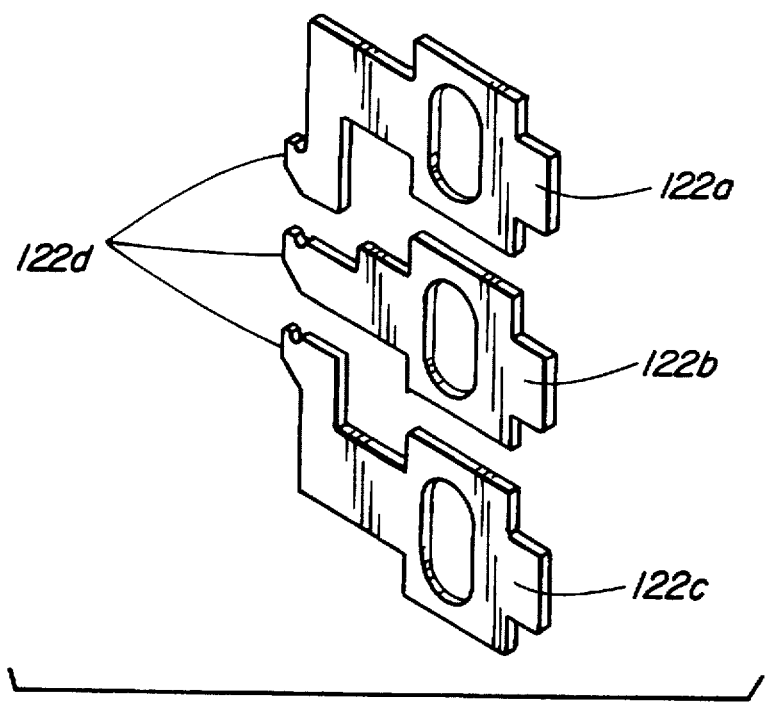
FIG. 23 is a perspective view of the horizontal slide plates in accordance with the invention.
Figure 24:
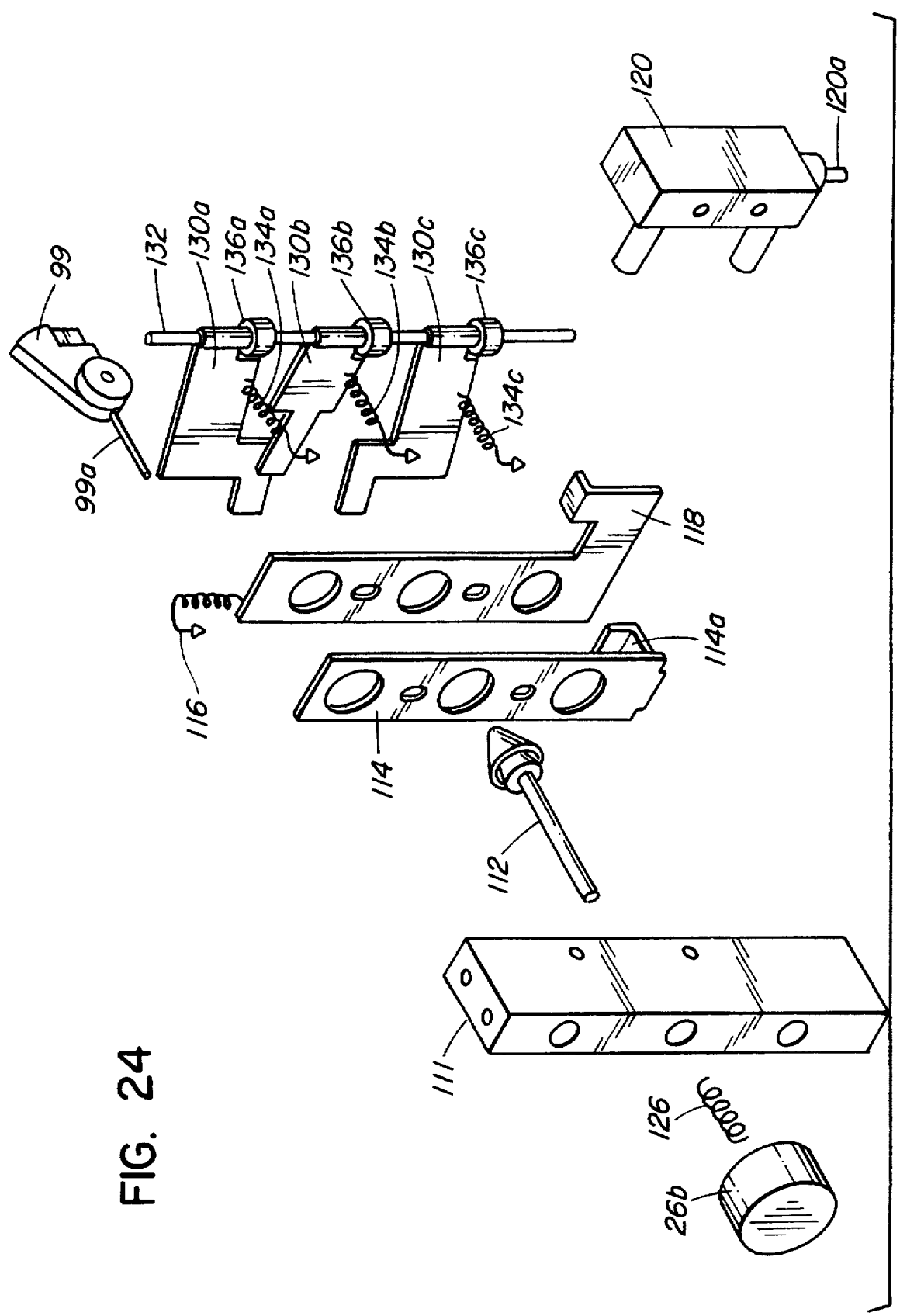
FIG. 24 is an exploded perspective view of the dispensed volume selector system in accordance with an alternative embodiment of the invention.
Figure 24A:
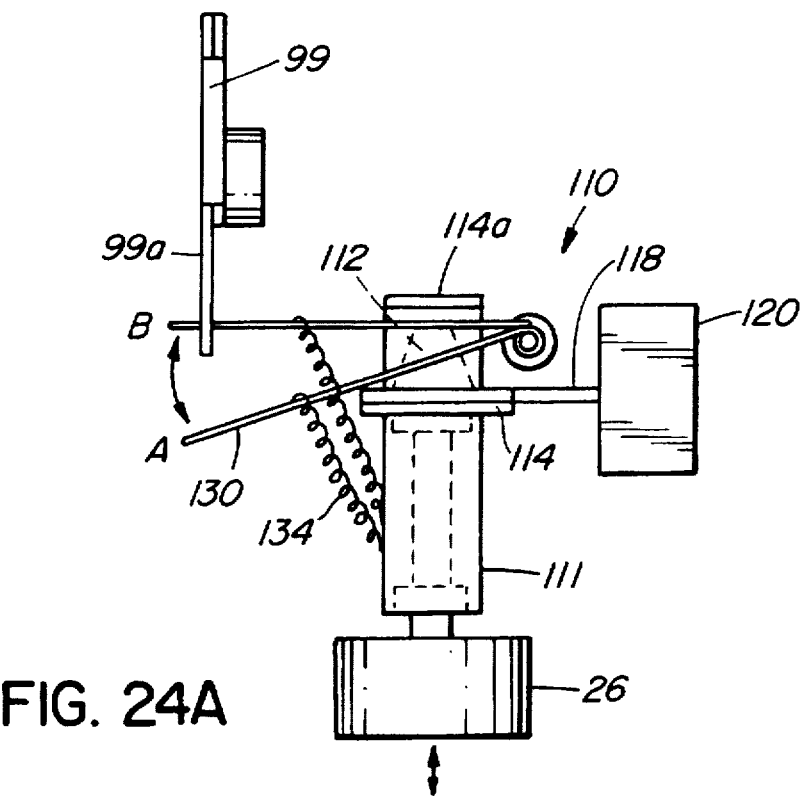
FIG. 24A is a top view of an alternative embodiment of the dispensed volume selector system in accordance with the invention.
Figure 25:
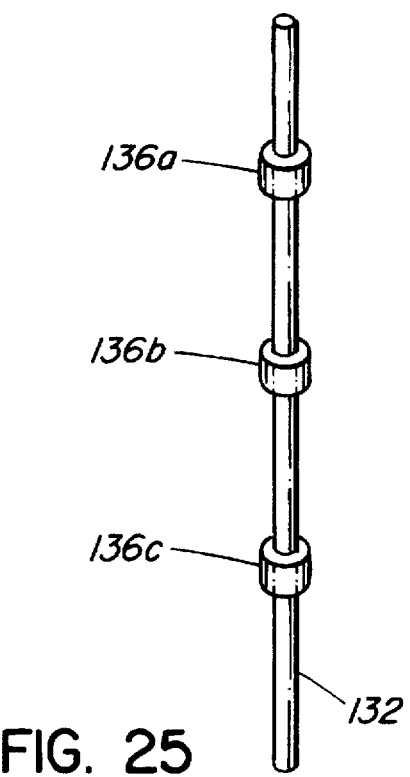
FIG. 25 is a perspective hinge shaft in accordance with an alternative embodiment of the invention.
Figure 26:
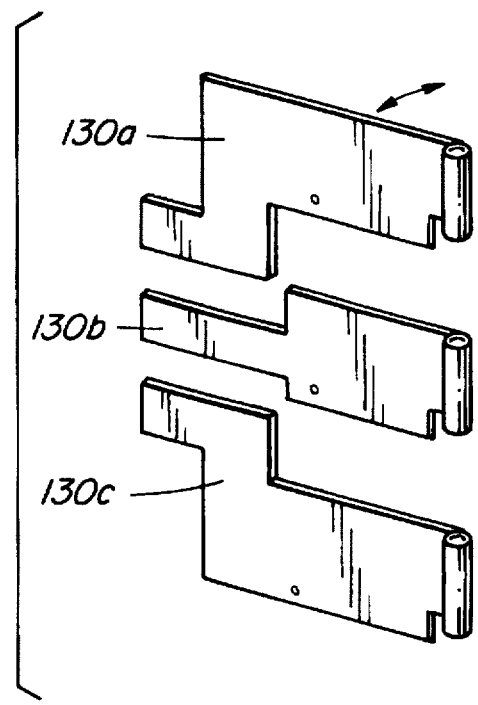
FIG. 26 is a perspective view of an alternative embodiment of the valve plate in accordance with the invention.

As seen in FIGS. 10 and 11, the shuttle block 72 includes a 3-way valve 100 with pin 100a and gas inlet 100b and gas outlet 100c. The three-way valve 100 controls actuation of the tilt cylinder piston 94a within tilt cylinder 94. At rest, the gas inlet 100b is closed to gas and the gas inlet/outlet 100d from the tilt cylinder 94 is open to the atmosphere. Under these conditions, the spring 96 is biased so as to tilt the disk 18. Upon depression of the pin 100a, the 3-way valve 100 changes state so as to direct gas to the tilt cylinder 94 while simultaneously closing the tilt cylinder 94 to the atmosphere, thereby causing movement of the piston 94a within the tilt cylinder 94 against the action of spring 96. Release of pin 100a reverses the process, venting the tilt cylinder 94 to the atmosphere, closing gas inlet 100b, and opening gas outlet 100d. Compression spring 96 returns the disk 18 to the resting position.

The shuttle block is also provided with a tilt cylinder piston seal 94b for sealing the cylinder 94, shuttle cylinder rod hole 98b for mounting bracket 98a, actuating rod hole 22a for mounting actuating rod 22 and seal stem hole 16b for allowing the valve stem 16a to pass through the shuttle block. Assembly of the seal system 70 and ejector system 90 is shown in FIG. 7.

Control of the 3-way valve 100, through pin 100a is achieved by valve cam 99 with cam arm 99a (FIG. 14), the operation of which is described below.

The shuttle block 72 is maintained in an upper position by gas pressure through the shuttle cylinder 98 which is controlled through 4-way valve 120, the operation of which is described below.

The control module 24 includes a dispensed volume selector system 110 as shown in FIGS. 14–23.

The volume selector system 110 allows the operator to select the desired volume to be dispensed. A single push of a button 26a, 26b or 26c initiates the dispensing operation. The machine 10 automatically determines the desired volume and ejects the topping. The machine then resets itself, ready for the next operation. The resetting motion also mixes the topping in the reservoir 12.

The automatic dispensing process is accomplished by the components in the dispensed volume selector system (FIG. 15), the shuttle cylinder 98, three-way valve 100, valve cam 99, tilt cylinder 94, piston assembly 92 located in the shuttle block 72 of the ejector system (FIG. 8), and the seal actuating cylinder and piston 74 located in the shuttle block 72 of the measuring chamber seal system 70 (FIG. 4).

The dispensing process is accomplished as follows:

a) When the desired volume button 26a, 26b or 26c (FIG. 15) is pushed, (Medium volume push button assembly shown in FIG. 15), a rod 112a within push button block 111 pushes cone cam 112 against a latch plate 114 (FIG. 21) and causes the latch plate 114 to be deflected downwards against light spring pressure 116. The cone cam 112 moves forward until the latch plate 114 snaps back up behind the base of the cone 112, thereby holding the push button 26b in a depressed state. The forward motion of the cone cam 112 also lifts the valve plate 118 against a return spring and pin 120a in the four-way valve 120.

The four-way valve 120 includes pin 120a, gas inlet and gas outlets 120c. The four way valve is mounted on the push button block 111 through mounting spacers 120. In operation, the 4-way valve 120 controls the vertical movement of the shuttle block 72. At rest, that is with the shuttle block 72 in the upper position, pin 120a is extended and gas pressure is directed to the lower side of the shuttle cylinder 98 to hold the shuttle block 72 in the upper position. As the valve plate 118 moves upwardly against pin 120a, this causes the four-way valve 120 to change state and allow $CO_2$ gas to flow to the upper side of the shuttle cylinder 98 (FIGS. 19 and 8) and start the shuttle block 72 moving in the downwards direction.

The rearward motion of the cone cam 112 also causes the middle horizontal slide plate 122b (FIGS. 23 and 15) to be deflected sideways against a light spring 124. Each horizontal slide plate 122 has a hooked surface 122d to engage with the valve cam 99a arm.

b) The shuttle block 72 and tilted ejector disk 18 move downwards until the three-way valve cam arm 99a (FIG. 8) hooks on a deflected horizontal slide plate 122a, 122b or 122c. Further downward motion causes the valve cam 99 to quickly rotate and depress pin 100a to change the state of the three-way valve 100. This action causes $CO_2$ gas to flow to both the tilt cylinder 94 in the shuttle block 72 and the seal actuating cylinder 80 in the shuttle block 72 (FIG. 4).

The tilt cylinder/piston 94 pulls up on the ejector disk 18 and rotates it into a horizontal position. This action traps a calibrated volume of topping in the measuring chamber 14 in such a way as to also create a partial vacuum in the measuring chamber 14. This is done to better control the flow of topping out of the chamber 14. At the same time, the seal valve 16 at the outlet of the measuring chamber 14 is pushed open by the seal actuating cylinder 80 in the top block 72. The shuttle block 72 and the ejector disk 18 continue to move down, ejecting the topping out of the measuring chamber 14.

The ejection speed may be regulated by an adjustable control to optimize the flow out of the dispenser (not shown). The adjustable control is preferably a throttle valve which adjusts the gas flow pressure to the 4-way valve.

c) At the bottom of the downward shuttle stroke, the shuttle block 72 contacts a reset arm 114a on the latch plate 114 (FIGS. 15 and 21), causing the latch plate 114 to be deflected downwards. This action disengages the cone cam 112, allowing a push button return spring 126 to snap the push button 26b forward. Release of the cone cam 112 from the latch plate 114 also causes valve plate 118 to move down thereby allowing pin 120a on the four-way valve 120 to return to its outward position and change the state of the 4-way valve 120 directing gas to the lower side of the shuttle cylinder 98 to initiate upward motion of the shuttle block 72. At the same time, a pin on the frame of the dispenser resets the three-way valve cam 99, allowing pin 100a on the three-way valve 100 to change state to initiate valve 16 closure and disk tilting.

As the shuttle block 72 moves upwards, the seal valve 16 closes the measuring chamber 14, and the ejector disk 18 tilts to allow the disk to slice through the topping on its way up. The shuttle block 72 continues to move up until stopped by a snap ring retainer 130 on the top of the seal valve stem 16 a and the physical limit of the shuttle cylinder travel. The system is now at rest, waiting for the next selection.

The horizontal slide plate blocks 132 (FIG. 20) allow independent adjustment of the height of the horizontal slide plates to allow the dispensed volumes to be adjusted.

In an alternate embodiment of the volume selector system 110, horizontal slide blocks 122 are replaced with swing arms 130a, 130b, and 130c pivotally mounted on pole 132 as shown in FIGS. 24, 24a, 25 and 26. In the resting position (position A, FIG. 24A), each swing arm is forwardly biased away from cam arm 99a by spring 134a, 134b or 134c respectively. Operation of the volume selector system is as described above with the exception of the movement of the swing arms 130. As the approriate cone cam 112 for the selected volume is depressed, the corresponding swing arm 130 is pushed rearwardly to engage the cam arm 99a (position B, FIG. 24A). Upon completion of the ejecting stroke, the push button 26 pops back as described above and the swing arm 130 is pulled forward by spring 134 to position A. The vertical position of each swing arm 130 may be adjusted by collars 136a, 136b or 136c respectively to enable calibration of the individual volumes.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The Embodiment Of The Invention In Which An Exclusive Property Or Privilege Is Claimed Are Defined As Follows:

1. A dispensing apparatus for delivering a selected volume of a liquid comprising:

a reservoir having an interior and exterior;

channel having a first end in fluid communication with the interior of the reservoir and a second end in fluid communication with the exterior of the reservoir;

valve sealing the second end of the channel;

a piston member having means for selectively pivoting the piston member within the channel at a location corresponding to the selected volume, the piston member pivoting between a first position where the piston member is in sealing contact with the channel and a second position where the piston member is out of sealing contact with the channel, the piston member also having means for displacing the piston member in a first direction from a resting position for expelling a volume of fluid from the channel through the valve and in an opposite direction for resetting the apparatus.

2. The dispensing apparatus as in claim 1 wherein the means for pivoting and means for displacing include first and second actuating rods pivotally connected to the piston member for moving the piston member between the first and second positions and in said first and opposite directions.

3. The dispensing apparatus as in claim 1 wherein the means for pivoting includes a tilt cylinder and tilt piston operatively connected to one of said actuating rods for movement of the piston member between the first and second positions.

4. The dispensing apparatus as in claim 3 wherein movement of the tilt piston with respect to the tilt cylinder is responsive to gas pressure through a tilt valve.

5. The dispensing apparatus as in claim 4 wherein the tilt valve is a single acting cylinder valve for controlling movement of the tilt piston with respect to the tilt cylinder in a single direction, the tilt valve responsive to a specific displaced position of the piston member with respect to the resting position.

6. The dispensing apparatus as in claim 5 wherein the piston member is biased towards the second position by a spring.

7. The dispensing apparatus as in claim 1 wherein the means for displacing includes a displacement cylinder and displacement well operatively connected to the first and second actuating rods for displacement of the tilting disk in the first and opposite directions.

8. The dispensing apparatus as in claim 7 wherein movement of the displacement cylinder with respect to the displacement well is responsive to gas pressure through a displacement valve.

9. The dispensing apparatus as in claim 8 wherein the displacement valve is a double acting cylinder valve to control movement of the displacement cylinder with respect to the cylinder well in the first and opposite directions, the displacement valve responsive to a volume selection system.

10. The dispensing apparatus as in claim 9 wherein the volume selection system includes a volume selection and sequence initiation means for initiating a dispensing sequence and a sequence termination means for terminating a dispensing sequence.

11. The dispensing apparatus as in claim 10 wherein the sequence initiation means includes:

at least one volume selection lever means, the volume selection lever means displaceable between a first position where said system is at rest and a second position;

latch means for holding said lever means in said second position;

displacement valve actuation means responsive to the lever means when the lever means is in the second position, the displacement valve actuation means for controlling the actuation of the displacement valve;

hinge plate responsive to the lever means when the lever means is in the second position, the hinge plate for controlling actuation of the tilt valve.

12. The dispensing system as in claim 11 wherein the volume selection lever means is a push button with a cone cam.

13. The dispensing apparatus as in claim 10 wherein the means for terminating includes latch release means on the latch plate for disengaging said lever means from the latch plate, the latch release means responsive to a specific displacement of the piston member with respect to the resting position.

14. The dispensing apparatus as in claim 11 wherein the volume selection system includes a dispensed volume adjustment means for adjusting the expelled volume of fluid.

15. The dispensing apparatus as in claim 1 wherein the valve includes:

a valve disk and stem for occluding the second end of the channel, the valve stem received within the measuring channel and having a return bias spring acting to passively close the valve;

valve piston and cylinder on the valve stem for actively opening the valve disk in response to gas pressure through the tilt valve.

16. The dispensing apparatus as in claim 4 wherein the gas pressure is compressed $CO_2$ gas.

17. The dispensing apparatus as in claim 8 wherein the gas pressure is compressed $CO_2$ gas.

18. A dispensing apparatus as in claim 1 wherein the means for displacement includes a gas flow control means to control the displacement rate.

19. A dispensing apparatus as in claim 1 where the reservoir is further provided with a heating or cooling unit to control the temperature of the reservoir.

20. A dispensing apparatus as in claim 1 wherein the reservoir is modular with respect to the channel, valve and piston member.

21. The dispensing apparatus as in claim 2 wherein the means for pivoting includes a tilt cylinder and tilt piston operatively connected to one of said actuating rods for movement of the piston member between the first and second positions.

22. The dispensing apparatus as in claim 21 wherein movement of the tilt piston with respect to the tilt cylinder is responsive to gas pressure through a tilt valve.

23. The dispensing apparatus as in claim 22 wherein the tilt valve is a single acting cylinder valve for controlling movement of the tilt piston with respect to the tilt cylinder in a single direction, the tilt valve responsive to a specific displaced position of the piston member with respect to the resting position.

24. The dispensing apparatus as in claim 23 wherein the piston member is biased towards the second position by a spring.

25. The dispensing apparatus as in claim 24 wherein the means for displacing includes a displacement cylinder and displacement well operatively connected to the first and second actuating rods for displacement of the tilting disk in the first and opposite directions.

26. The dispensing apparatus as in claim 25 wherein movement of the displacement cylinder with respect to the displacement well is responsive to gas pressure through a displacement valve.

27. The dispensing apparatus as in claim 26 wherein the displacement valve is a double acting cylinder valve to control movement of the displacement cylinder with respect to the cylinder well in the first and opposite directions, the displacement valve responsive to a volume selection system.

28. The dispensing apparatus as in claim 27 wherein the volume selection system includes a volume selection and sequence initiation means for initiating a dispensing sequence and a sequence termination means for terminating a dispensing sequence.

29. The dispensing apparatus as in claim 28 wherein the sequence initiation means includes:
- at least one volume selection lever means, the volume selection lever means displaceable between a first position where said system is at rest and a second position;
- latch means for holding said lever means in said second position;
- displacement valve actuation means responsive to the lever means when the lever means is in the second position, the displacement valve actuation means for controlling the actuation of the displacement valve;
- hinge plate responsive to the lever means when the lever means is in the second position, the hinge plate for controlling actuation of the tilt valve.

30. The dispensing system as in claim 29 wherein the volume selection lever means is a push button with a cone cam.

31. The dispensing apparatus as in claim 30 wherein the means for terminating includes latch release means on the latch plate for disengaging said lever means from the latch plate, the latch release means responsive to a specific displacement of the piston member with respect to the resting position.

32. The dispensing apparatus as in claim 31 wherein the valve includes:
- a valve disk and stem for occluding the second end of the channel, the valve stem received within the measuring channel and having a return bias spring acting to passively close the valve;
- valve piston and cylinder on the valve stem for actively opening the valve disk in response to gas pressure through the tilt valve.

33. A dispensing apparatus comprising:
- a reservoir having an interior and exterior;
- channel having a first end in fluid communication with the interior of the reservoir and a second end in fluid communication with the exterior of the reservoir;
- valve sealing the second end of the channel;
- a piston member having first and second actuating rods for selectively pivoting the piston member within the channel at a location corresponding to the selected volume, the piston member pivoting between a first position where the piston member is in sealing contact with the channel and a second position where the piston member is out of sealing contact with the channel and for displacing the piston member in a first direction from a resting position for expelling a volume of fluid from the channel through the valve and in an opposite direction for resetting the apparatus;
- a tilt cylinder and tilt piston operatively connected the first of said actuating rods for movement of the tilting disk between the first and second positions, the tilt cylinder and piston responsive to gas pressure through a single acting cylinder valve for controlling movement of the tilt piston with respect to the tilt cylinder in a single direction, the single acting cylinder valve responsive to a specific displaced position of the piston member with respect to the resting position;
- spring on said first actuating rod for biasing the first actuating rod towards the second position;
- displacement cylinder and displacement well operatively connected to the first and second actuating rods for displacement of the tilting disk in the first and opposite directions, wherein movement of the displacement cylinder with respect to the displacement well is responsive to gas pressure through a double acting displacement valve, the displacement valve responsive to a volume selection system, the volume selection system including:
- at least one volume selection lever, the volume selection lever displaceable between a rest position where said system is at rest and an active position;
- latch for holding said lever in said active position;
- displacement valve actuation member responsive to the lever when the lever means is in the active position, the displacement valve actuation member for controlling actuation of the displacement valve;
- hinge plate responsive to the lever when the lever is in the active position, the hinge plate for controlling actuation of the tilt valve;
- latch release member on the latch plate for disengaging said lever from the latch plate, the latch release member responsive to the displacement of the piston member with respect to the resting position.

\* \* \* \* \*